(12) United States Patent
Yoo et al.

(10) Patent No.: US 9,909,018 B2
(45) Date of Patent: Mar. 6, 2018

(54) SHEAR THICKENING FLUID CONTAINING CARBON NANOPARTICLES AND SHOCK ABSORBING MATERIAL COMPRISING SAME

(71) Applicant: KOREA INSTITUTE OF INDUSTRIAL TECHNOLOGY, Cheonan-si, Chungcheongnam-do (KR)

(72) Inventors: Eui Sang Yoo, Jeonju-si (KR); Ju Hea Kim, Seoul (KR); Won Young Jeong, Gunpo-si (KR); Hyun Kyung Lee, Suwon-si (KR); Jae Kyoung Lee, Guri-si (KR); Joon Taek Jun, Ansan-si (KR); Nam Hee Kwon, Seoul (KR); Mi Yeon Kwon, Anyang-si (KR); Dae Young Lim, Yongin-si (KR)

(73) Assignee: KOREA INSTITUTE OF INDUSTRIAL TECHNOLOGY, Cheonan-si, Chungcheongnam-do (KR)

( * ) Notice: Subject to any disclaimer, the term of this patent is extended or adjusted under 35 U.S.C. 154(b) by 0 days.

(21) Appl. No.: 15/035,237

(22) PCT Filed: Mar. 12, 2014

(86) PCT No.: PCT/KR2014/002069
§ 371 (c)(1),
(2) Date: May 9, 2016

(87) PCT Pub. No.: WO2015/068905
PCT Pub. Date: May 14, 2015

(65) Prior Publication Data
US 2016/0289467 A1    Oct. 6, 2016

(30) Foreign Application Priority Data

Nov. 7, 2013    (KR) .................. 10-2013-0134821

(51) Int. Cl.
*C09D 7/00* (2006.01)
*D06M 11/74* (2006.01)
(Continued)

(52) U.S. Cl.
CPC ............. *C09D 7/004* (2013.01); *D06M 11/74* (2013.01); *D06M 11/79* (2013.01);
(Continued)

(58) Field of Classification Search
None
See application file for complete search history.

(56) References Cited

U.S. PATENT DOCUMENTS

2005/0266748 A1    12/2005    Wagner et al.
2006/0234572 A1*   10/2006    Wagner .................. C08L 71/02
                                                         442/59
(Continued)

FOREIGN PATENT DOCUMENTS

KR    10-2009-0112416 A    10/2009
WO        2009-053946 A2     4/2009

OTHER PUBLICATIONS

International Search Report for PCT/KR2014/002069 dated Aug. 27, 2014 from Korean Intellectual Property Office.

*Primary Examiner* — Colin W. Slifka
(74) *Attorney, Agent, or Firm* — Revolution IP, PLLC

(57) ABSTRACT

Disclosed are a shear thickening fluid (STF) comprising solid particles and a dispersion medium, wherein the solid particles comprise silica particles as a first component and carbon nanoparticles as a second component and a method for preparing a shear thickening fluid, comprising mixing silica particles, a dispersion medium for silica particles, and a carbon nanoparticle dispersion.

3 Claims, 3 Drawing Sheets

(51) Int. Cl.
*D06M 11/79* (2006.01)
*D06M 13/17* (2006.01)
*F41H 5/007* (2006.01)
*D06M 13/165* (2006.01)

(52) U.S. Cl.
CPC .......... *D06M 13/165* (2013.01); *D06M 13/17* (2013.01); *F41H 5/007* (2013.01)

(56) References Cited

U.S. PATENT DOCUMENTS

2009/0004413 A1    1/2009   Wagner et al.
2010/0093240 A1    4/2010   Wagner et al.
2014/0034862 A1*   2/2014   Gilstad ................ F16K 25/005
                                                                                     251/332

\* cited by examiner

[Fig. 1]
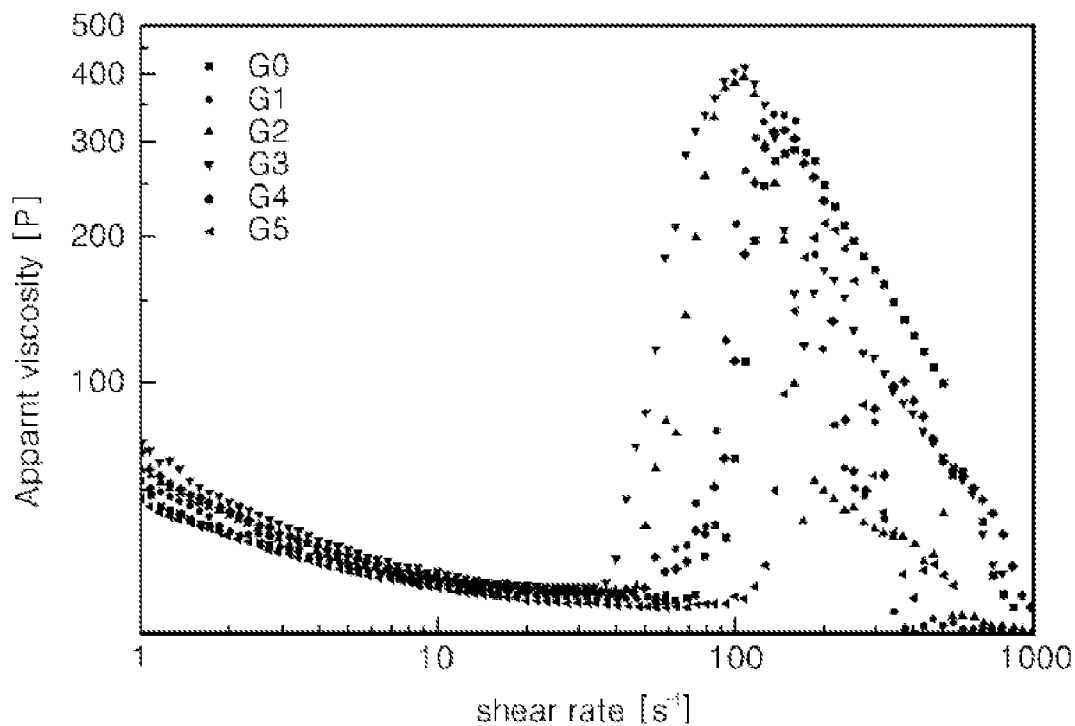
[Fig. 2]
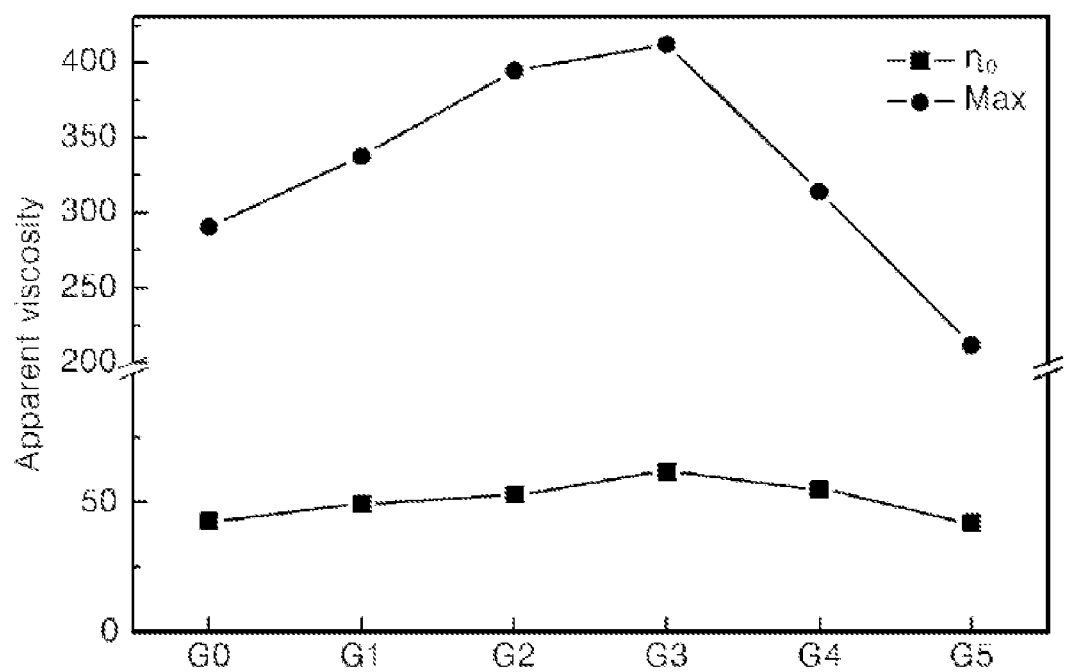

[Fig. 3]
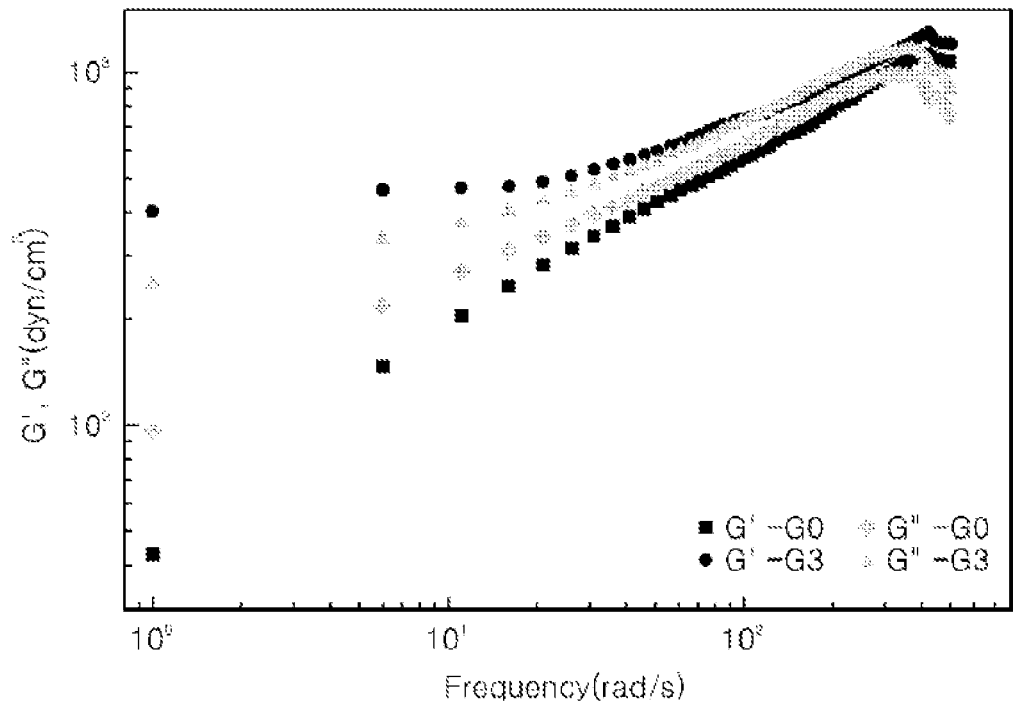
[Fig. 4]
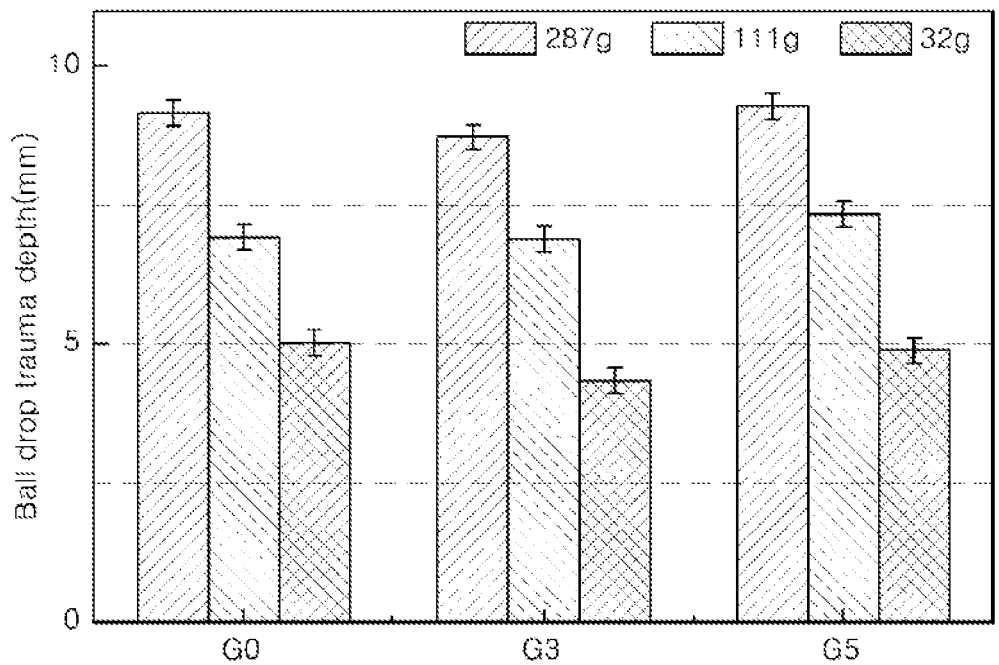

[Fig. 5]
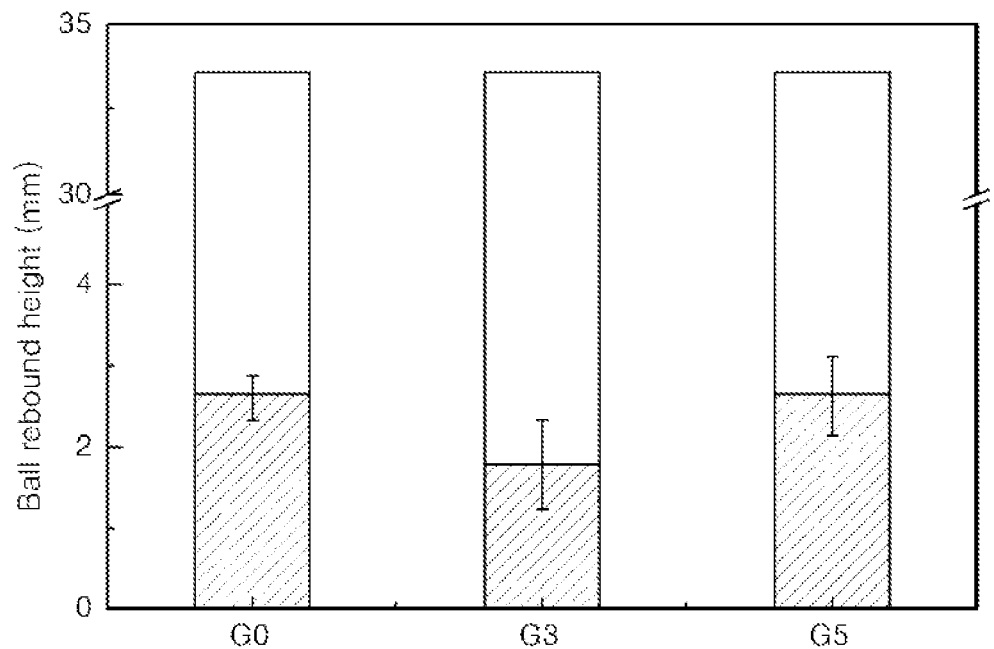
[Fig. 6]
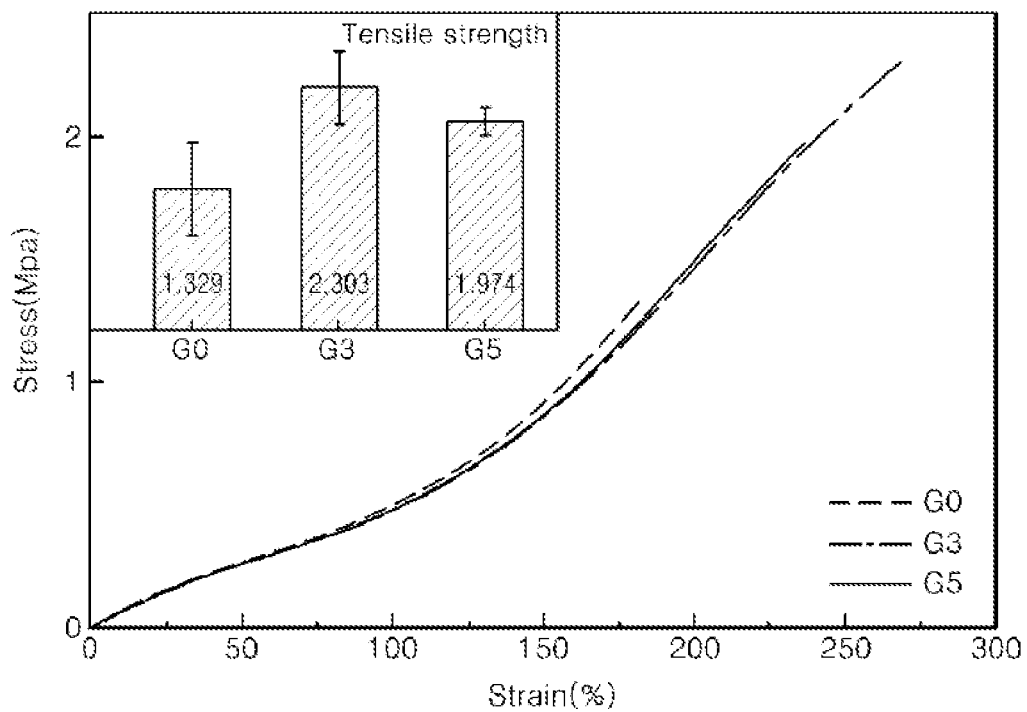

SHEAR THICKENING FLUID CONTAINING CARBON NANOPARTICLES AND SHOCK ABSORBING MATERIAL COMPRISING SAME

TECHNICAL FIELD

The present invention relates to a shear thickening fluid ("STF") and a shock-absorbing material containing the same.

BACKGROUND ART

Suspension or liquid dispersion systems in which fine particles are dispersed in a continuous-phase solvent are divided into the following two categories according to shear rate characteristics: Newtonian fluids that show a constant viscosity regardless of a change in the shear rate; and non-Newtonian fluids whose viscosity changes when the shear rate changes.

A shear thickening fluid (STF), a kind of non-Newtonian fluid, is a fluid such as a colloidal suspension which contains solid particles dispersed in a liquid dispersion medium and which reversibly changes from a liquid state to a solid state due to its rheological properties when the shear stress or shear rate thereof increases to rapidly increase the viscosity.

The shear thickening fluid is usually in a liquid state, and changes to a solid state when a sudden shock is externally applied thereto. Due to this property, studies focused on impregnating the shear thickening fluid into fibers to provide bullet-resistant or stab-resistant materials are currently being actively conducted.

The shear thickening fluid is generally prepared as a sol-type dispersion or suspension by mixing nano-sized silica particles as solid particles with the polar solvent polyethylene glycol as a dispersion medium. In order to bullet-resistant or stab-resistant performance using the shear thickening fluid, it is required to increase the rate of filling of inorganic particles in the shear thickening fluid or the rate of impregnation of the shear thickening fluid in fibers. If the rate of filling of inorganic particles or the rate of impregnation of the shear thickening fluid is increased as described above, the weight of the resulting bullet-resistant material can be greatly increased, making it difficult to provide lightweight materials, the resulting bullet-resistant material can absorb a certain amount of shock, but a significant amount of shock will be applied to the human body.

Thus, there is a need for studies on shear thickening fluids having an improved ability to absorb external shock while having improved viscosity properties.

DISCLOSURE

Technical Problem

Accordingly, the present invention has been made keeping in mind the above-described problems occurring in the prior art, and an object of the present invention is to provide a shear thickening fluids having an improved ability to absorb external shock while having improved viscosity properties.

Technical Solution

In order to accomplish the above object, the present invention provides a shear thickening fluid comprising solid particles and a dispersion medium, wherein the solid particles comprise silica particles as a first component and carbon nanoparticles as a second component.

The carbon nanoparticles may be graphene oxide nanoparticles, graphene nanoparticles or graphite oxide nanoparticles.

The silica particles may be fumed silica particles.

The fumed silica particles have a bimodal particle size distribution.

The dispersion medium may be selected from the group consisting of polyethylene glycol, ethylene glycol, and polypropylene glycol.

The present invention also provides a method for preparing a shear thickening fluid, comprising mixing silica particles, a dispersion medium for silica particles, and a carbon nanoparticle dispersion. The preparation method according to the present invention may comprise: stirring the carbon nanoparticle dispersion and a dispersion medium; drying the stirred material under reduced pressure to remove water and other solvent, thereby preparing the dispersion medium for silica particles; and adding silica particles to the prepared dispersion medium for silica particles, followed by mixing.

The carbon nanoparticle dispersion may be used in an amount of 10-15 wt % based on the total weight of the shear thickening fluid, and the silica particles may be used in an amount of 5-20 wt % based on the total weight of the shear thickening fluid.

The concentration of the carbon nanoparticle dispersion may be 0.01-2%, preferably 0.03-1%.

The present invention also provides a shock-absorbing material containing the shear thickening fluid prepared as described above.

Advantageous Effects

The shear thickening fluid (STF) containing carbon nanoparticles according to the present invention has very excellent viscosity properties and significantly improved shock absorption performance compared to conventional shear thickening fluids composed only of silica particles without carbon nanoparticles.

DESCRIPTION OF DRAWINGS

FIG. 1 is a graph showing the change in viscosity as a function of shear rate of each of shear thickening fluids prepared in Examples 1 to 5 of the present invention and a Comparative Example (Comparative Example=G0, Example 1=G1, Example 2=G2, Example 3=G3, Example 4=G4, and Example 5=G5).

FIG. 2 is a graph showing the differences in the initial viscosity and maximum viscosity at 26° C. of shear thickening fluids prepared in Examples 1 to 5 of the present invention and a Comparative Example (Comparative Example=G0, Example 1=G1, Example 2=G2, Example 3=G3, Example 4=G4, and Example 5=G5).

FIG. 3 is a graph showing the changes in elastic component (G') and viscous component (G") with a change in frequency of each of shear thickening fluids prepared in Example 3 (G3) of the present invention and a Comparative Example (G0).

FIG. 4 is a graph showing the results of measuring the ball drop trauma depth of shock-absorbing materials prepared in Example 6 of the present invention (Comparative Example=G0, Example 3=G3, and Example 5=G5).

FIG. 5 is a graph showing the results of measuring the ball rebound height of shock-absorbing materials prepared in Example 6 of the present invention (Comparative Example=G0, Example 3=G3, and Example 5=G5).

FIG. 6 is a graph showing the results of measuring the elongation and tensile strength of shock-absorbing materials prepared in Example 6 of the present invention (Comparative Example=G0, Example 3=G3, and Example 5=G5).

MODE FOR INVENTION

In the present invention, the term "dispersion" may be used in the same sense as the term "suspension".

In the present invention, the term "silica" means nano-sized particles.

To achieve the above-described object, the present inventors have conducted studies, and as a result, have found that, when solid particles that are used in a shear thickening fluid comprise silica particles as a first component and carbon nanoparticles as a second component, the maximal viscosity value and shock absorption performance thereof very significantly increase compared to those of silica particles alone, thereby completing the present invention.

A shear thickening fluid (STF) according to the present invention comprises solid particles and a dispersion medium, wherein the solid particles comprise silica as a first component and carbon nanoparticles as a second component.

In the present invention, the carbon nanoparticles may be selected from among graphene oxide (GO) nanoparticles, graphite oxide nanoparticles and graphene nanoparticles, and may preferably be graphene oxide nanoparticles.

Graphene oxide that is graphite oxide is synthesized by oxidizing graphite with $KClO_3/HNO_3$ or $KMnO_4/H_2SO_4$ so as to have a significant amount of oxygen. Because of such oxygen functional groups, graphite oxide becomes hydrophilic. When graphite oxide is added to water and sonicated, it can be exfoliated as graphene oxide having a sheet of frames, and thus a very stable dispersion can be obtained in large amounts.

Although the exact chemical structure of graphene oxide has not been identified until now, Lerf's model represented by the following formula 1 is highly probable. Specifically, it is known that graphene oxide has a hydroxyl group and an epoxy group on the surface and a carboxyl group and a ketone group at the end.

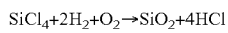

Formula 1

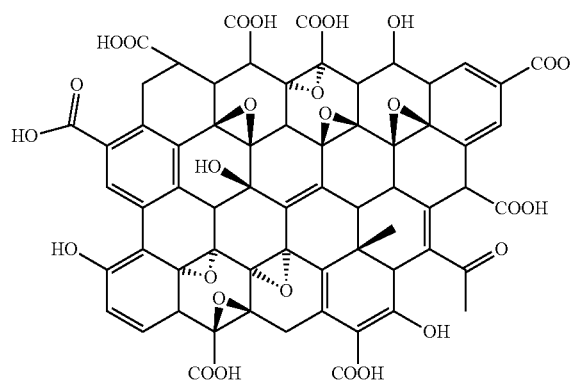

The carbon nanoparticles preferably have an average particle size of 1000 nm or less. The carbon nanoparticles generally have a monomodal particle size distribution, but may have a bimodal particle size distribution due to the intermolecular cohesive force. In preparation of the shear thickening fluid according to the present invention, the carbon nanoparticles are added as a dispersion. Herein, the dispersion medium is a polar solvent such as water or DMF, and the concentration of the carbon nanoparticle dispersion is preferably 0.01-2% (g/ml), more preferably 0.03-1%. The carbon nanoparticle dispersion is preferably added in an amount of 5-20 wt %, more preferably 10-15 wt %, based on the total weight of the shear thickening fluid.

In the present invention, the silica particles may be any known silica particles such as fumed silica particles or spherical silica particles, which are used in shear thickening fluids. Preferably, the silica particles are fumed silica particles. The fumed silica particles are formed by hydrolysis in flames at a temperature of 1,000° C. or higher as shown in the following reaction equation:

$$SiCl_4+2H_2+O_2 \rightarrow SiO_2+4HCl \qquad \text{Reaction Equation 1}$$

Primary particles made in flames are connected to one another due to mutual collision to form secondary particles which form three-dimensional aggregates (agglomerates). The primary particles of the fumed silica particles are very small in size, are amorphous, and have a large surface area.

Such fumed inorganic particles have advantages over spherical silica particles or colloidal silica particles in that they have a very small primary particle size, are lightweight, have a large surface area, and improve the lightweight properties of products. In addition, such fumed particles have a very big advantage in terms of costs. On the contrary, unlike spherical silica particles in which the size of primary particles is the same as the size of secondary particles, the fumed silica particles have a problem in that they are very difficult to disperse uniformly, due to their aggregation. However, in a previous study, the present inventors found that the fumed silica particles can be effectively controlled to be dispersed and the shear thickening property (bullet-resistant property) thereof is improved, as disclosed in Korean Laid-Open Patent Publication No. 10-2012-0122387.

The fumed silica particles may be distributed non-uniformly and may have a bimodal particle size distribution. This reason is believed to be because the fumed silica particles can be filled at an increased rate while being distributed non-uniformly in a dispersion medium and easily form hydroclusters. This can maximize the frictional force in a thread coming-out phenomenon that occurs upon the collision of a bullet, thereby improving the bullet-resistant property and preventing the fumed silica particles from being separated from bullet-resistant materials.

In the shear thickening fluid comprising the silica particles having a bimodal particle size distribution, the silica particles may have a particle size distribution in which the size of small-diameter silica particles is 50-100 nm and the size of large-diameter silica particles is 110-150 nm. Preferably the silica particles may preferably have a particle size distribution in which the size of small-diameter silica particles is 60-80 nm and the size of large-diameter silica particles is 110-120 nm. Herein, the small-diameter silica particles and the large-diameter silica particles are preferably contained in the shear thickening fluid at a weight ratio of about 6:4 to 9:1, more preferably 7:3. If the silica particles having a particle size difference of about 10-100 nm between the small-diameter silica particles and the large-diameter silica particles as described above are distributed non-uniformly in an organic solvent, preferably in the form of a bimodal particle size distribution, the effect of the non-uniform distribution of the fumed silica particles can be maximized, thereby improving the bullet-resistant property at the same weight and improving the lightweight property.

The silica particles are preferably contained in an amount of 5-30 wt %, more preferably 10-20 wt %, based on the total weight of the shear thickening fluid.

A dispersion medium for the silica particles, which is used in the present invention, may be selected from among polar dispersion media such as low-molecular-weight glycols, including polyethylene glycol, ethylene glycol, propylene glycols, etc. This is because the silica particles have a large amount of a hydroxyl group on the surface, and thus are very stably dispersed in a polar dispersion medium, but are less stable in a non-polar organic dispersion medium to form a colloidal gel.

In the present invention, the shear thickening fluid may be prepared by: stirring the carbon nanoparticle dispersion and a dispersion medium; drying the stirred material under reduced pressure to remove water and other solvent, thereby preparing the dispersion medium for silica particles; and adding silica particles to the prepared dispersion medium for silica particles, followed by mixing. However, if necessary, the silica particles, the dispersion medium for silica particles and the carbon nanoparticle dispersion may also be added together and mixed in a single step.

The shear thickening fluid of the present invention may be prepared by stirring each component using a mixing device or a homogenizer. Herein, the stirring speed is about 120-3000 rpm for non-uniform particle distribution. If the stirring speed is less than 120 rpm, the solid particles will be difficult to mix with the dispersion medium, and the stirring speed is more than 3000 rpm, it will be difficult to achieve a non-uniform silica particle distribution such as the above-described bimodal particle size distribution.

Hereinafter, the present invention will be described in detail with reference to preferred examples and comparative examples. The examples of the present invention may, however, be embodied in different forms and should not be construed as limited to the examples set forth herein. Rather, these examples are provided so that this disclosure will be thorough and complete, and will fully convey the scope of the present invention to those skilled in the art.

Materials

Fumed silica particles: Aerosil 200 (A200, Evonik Degussa Corporation) particles were used which are hydrophilic silica particles having a specific surface area (BET) of 200±25 $m^2/g$, an average primary particle size of 12 nm and an equivalent property of about 2.5 [SiOH] group/$nm^2$ or 0.84 mmol/g.

Dispersion medium: polyethylene glycol (molecular weight: 200; Sigma-Aldrich Corporation) was used. It was dried under reduced pressure at 50° C. for 8 hours to remove water.

Graphene oxide: Graphene oxide (concentration: 0.0307%; H&H Corporation).

Polymer material: PDMS (polydimethylsiloxane) (trade name: Sylgard 184 A/B, Dow-Coning).

Example 1

5 g of a graphene oxide dispersion (concentration: 0.0307%) was added to 82 g of polyethylene glycol, and the mixture was stirred for 30 minutes and dried under reduced pressure to remove water and other solvent, thereby preparing a dispersion medium for silica particles. The prepared dispersion medium was allowed to stand at room temperature for 24 hours so that it would be stabilized.

18 g of fumed silica particles were added to 87 g of the above-prepared dispersion medium for silica particles, and the mixture was stirred using a stirring motor (M8GA6M, Panasonic) and an anchor-type impeller at a speed of 150 rpm for 1 hour, thereby preparing a silica particle dispersion. The prepared silica particle dispersion was allowed to stand at room temperature for 24 hours to remove bubbles.

Example 2

The same process as described in Example 1 was repeated, except that 10 g of the graphene oxide dispersion (concentration: 0.0307%) was added to polyethylene glycol.

Example 3

The same process as described in Example 1 was repeated, except that 12.5 g of the graphene oxide dispersion (concentration: 0.0307%) was added to polyethylene glycol.

Example 4

The same process as described in Example 1 was repeated, except that 15 g of the graphene oxide dispersion (concentration: 0.0307%) was added to polyethylene glycol.

Example 5

The same process as described in Example 1 was repeated, except that 20 g of the graphene oxide dispersion (concentration: 0.0307%) was added to polyethylene glycol.

Example 6

5 wt % of each of the shear thickening fluids prepared in the above Examples and a Comparative Example was added to polydimethylsiloxane (substrate:curing agent=10:1), and the mixture was stirred and cured at 25° C. for 24, thereby preparing shock-absorbing materials.

Comparative Example 1: (Containing no Carbon Nanoparticle)

18 g of fumed silica particles were mixed with 82 g of polyethylene glycol, and the mixture was stirred using a stirring motor (M8GA6M, Panasonic) and an anchor-type impeller at a speed of 150 rpm for 1 hour, thereby preparing a dispersion. The prepared dispersion was allowed to stand at room temperature for 24 hours to remove bubbles.

Test Example 1: Measurement of Viscosities of Shear Thickening Fluids

In order to observe the rheological behaviors of the shear thickening fluids prepared in Examples 1 to 5 of the present invention and the Comparative Example, the shear viscosity versus shear rate of each of the shear thickening fluids was measured with a strain controlled rheometer (ARES) (Advanced Rheometric Expansion System, Rheometric Scientific, USA). The measurement was performed at 25° C. using Cone & plate type viscometer having a diameter of 50 mm and an angle of 2°. The shear rate of the sample was measured in the range of 1-1000 $s^{-1}$. All the samples were pre-sheared at 10 $s^{-1}$ for 1 minute in order to remove shear hysteresis from the samples before measurement.

FIG. 1 is a graph showing the change in viscosity as a function of shear rate of each of the shear thickening fluids prepared in Examples 1 to 5 of the present invention and the Comparative Example (Comparative Example=G0, Example 1=G1, Example 2=G2, Example 3=G3, Example 4=G4, and Example 5=G5).

FIG. 2 is a graph showing the differences in the initial viscosity and maximum viscosity at 26° C. of the shear thickening fluids prepared in Examples 1 to 5 of the present invention and the Comparative Example (Comparative Example=G0, Example 1=G1, Example 2=G2, Example 3=G3, Example 4=G4, and Example 5=G5).

As can be seen in FIGS. 1 and 2, the shear thickening fluid containing graphene oxide according to the present invention showed a difference in the critical shear rate depending on the content of graphene oxide, and showed viscosity properties higher than those of the shear thickening fluid of the Comparative Example. In addition, it could be seen that the shear thickening fluid of Example 3 (G3; content: 12.5 g) had significantly improved viscosity properties.

FIG. 3 is a graph showing the changes in elastic component (G') and viscous component (G") with a change in frequency of each of the shear thickening fluids prepared in Example 3 (G3) of the present invention and the Comparative Example (G0). As shown in FIG. 3, in the Comparative Example, the viscosity component was higher than the elastic component, whereas in Example 3 of the present invention, the elastic component was higher than the viscous component, suggesting that the shear thickening fluid of the present invention can be used for shock-absorbing materials.

Test Example 2: Rebound and Shock Tests for Shock-Absorbing Materials

The shock-absorbing abilities of the shock-absorbing materials prepared according to the present invention were measured. A ball drop shock test was performed using three kinds of balls (a 32 g ball (diameter: 2 mm), a 111 g ball (diameter: 3 mm) and a 287 g ball (diameter: 4 mm)) at a height of 500 mm, and a ball rebound test was performed by measuring the rebound height of a 16.8 g ball (diameter: 16 mm) after dropping from a height of 500 mm.

FIG. 4 is a graph showing the results of measuring the ball drop trauma depth of the shock-absorbing materials prepared in Example 6 of the present invention (Comparative Example=G0, Example 3=G3, and Example 5=G5).

FIG. 5 is a graph showing the results of measuring the ball rebound height of the shock-absorbing materials prepared in Example 6 of the present invention (Comparative Example=G0, Example 3=G3, and Example 5=G5).

As shown in FIGS. 4 and 5, the trauma depth and ball rebound height of the shear thickening fluid containing graphene oxide according to Example 3 of the present invention were very significantly lower than those of the Comparative Example. This suggests that the shear thickening fluid according to the present invention can be effectively used as a shock-absorbing material.

Test Example 3: Test for Tensile Strengths of Shock-Absorbing Materials

A tensile strength test for the shock-absorbing material prepared according to the present invention was performed according to the ISO 1798:2008 method using a constant speed type tensile tester at a gauge length of 50 mm and at a test speed of 100 mm/min.

FIG. 6 is a graph showing the results of measuring the elongation and tensile strength of the shock-absorbing materials prepared in Example 6 of the present invention (Comparative Example=G0, Example 3=G3, and Example 5=G5).

As shown in FIG. 6, the tensile strength of the shear thickening fluid containing graphene oxide, prepared in the Example of the present invention, was very significantly higher than that of the Comparative Example.

The invention claimed is:

1. A shear thickening fluid (STF) comprising solid particles and a dispersion medium, wherein the solid particles comprise silica particles as a first component and carbon nanoparticles as a second component,
    wherein the carbon nanoparticles are graphene oxide nanoparticles, graphene nanoparticles or graphite oxide nanoparticles and are contained in an amount of 5-20 wt % based on the total weight of the shear thickening fluid,
    wherein the silica particles are fumed type particles having a bimodal particle size distribution which are distributed non-uniformly in the dispersion medium and are contained in an amount of 5-30 wt % based on the total weight of the shear thickening fluid,
    wherein the fumed type silica particles include small-diameter silica particles and large-diameter silica particles, a size of the small-diameter silica particles being 50-100 nm and a size of the large-diameter silica particles being 110-150 nm,
    wherein a weight ratio of the small-diameter silica particles and the large-diameter silica particles is 6:4 to 9:1.

2. The shear thickening fluid of claim 1, wherein the dispersion medium is selected from the group consisting of polyethylene glycol, ethylene glycol, and polypropylene glycol.

3. A shock-absorbing material containing the shear thickening fluid of claim 1.

* * * * *